(12) United States Patent
Wasnick et al.

(10) Patent No.: US 11,001,244 B1
(45) Date of Patent: May 11, 2021

(54) BRAKE ACTUATOR USING FLUID BLADDER OR BLADDERS AS FLUID CHAMBERS

(71) Applicant: Bendix Commercial Vehicle Systems LLC, Elyria, OH (US)

(72) Inventors: Paul M. Wasnick, Elyria, OH (US); Nathan R. Plow, Elyria, OH (US); Jeremy A. Brown, Elyria, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 16/860,663

(22) Filed: Apr. 28, 2020

(51) Int. Cl.
| | |
|---|---|
| *B60T 13/58* | (2006.01) |
| *F16D 65/16* | (2006.01) |
| *B60T 13/36* | (2006.01) |
| *B60T 13/38* | (2006.01) |
| *F16D 127/02* | (2012.01) |

(Continued)

(52) U.S. Cl.
CPC ............ *B60T 13/588* (2013.01); *B60T 13/36* (2013.01); *B60T 13/38* (2013.01); *F16D 65/16* (2013.01); *F16D 2121/08* (2013.01); *F16D 2121/10* (2013.01); *F16D 2127/02* (2013.01)

(58) Field of Classification Search
CPC ........ B60T 13/36; B60T 13/38; B60T 13/588; B60T 13/741; B60T 17/083; B60T 17/085; B60T 17/088; B60T 17/16; F16D 65/16; F16D 65/28; F16D 2121/08; F16D 2121/10; F16D 2127/02; F16D 2121/26; F16D 2121/06; F16D 2123/00; F16D 2125/28; F16D 2125/40; F16D 2125/66;

(Continued)

(56) References Cited

U.S. PATENT DOCUMENTS

| | | |
|---|---|---|
| 2,754,805 A | 7/1956 | Beman |
| 3,431,031 A | 3/1969 | Ike |

(Continued)

FOREIGN PATENT DOCUMENTS

| | | |
|---|---|---|
| CN | 2175713 Y | 8/1994 |
| CN | 205113311 U | 3/2016 |

(Continued)

OTHER PUBLICATIONS

Bendix Service Data Document SD-02-4525, Oct. 2017, pp. 1-12, (12 pages).

*Primary Examiner* — Robert A. Siconolfi
*Assistant Examiner* — San M Aung
(74) *Attorney, Agent, or Firm* — Crowell & Moring LLP (57) ABSTRACT

A brake actuator has a plurality of actuator housing portions, a parking piston axially displaceable within one of the actuator housing portions, and a service piston axially displaceable independently of the parking piston within another of the actuator housing portions. A brake actuator rod projecting from the other of the actuator housing portions moves outward of that actuator housing portion upon at least one of fluid supply to a first substantially torus-shaped service brake bladder and fluid relief from a second substantially torus-shaped parking brake bladder. The brake actuator rod can be moved inward into the other of the actuator housing portions upon fluid relief from the first substantially torus-shaped service brake bladder, and fluid supply to the second substantially torus-shaped parking brake bladder or both.

21 Claims, 7 Drawing Sheets

(51) Int. Cl.
*F16D 121/10* (2012.01)
*F16D 121/08* (2012.01)

(58) Field of Classification Search
CPC ............ F16D 2125/48; F16D 2125/36; F16D 2125/52; F16D 2127/008; F16D 2127/04
USPC ............ 188/106 F, 170, 70 R; 92/63, 78, 94, 92/98 R, 134, 64; 303/9
See application file for complete search history.

(56) References Cited

U.S. PATENT DOCUMENTS

| | | | |
|---|---|---|---|
| 3,479,927 A | | 11/1969 | Woodward |
| 3,509,795 A | | 5/1970 | Woodward |
| 5,215,170 A | * | 6/1993 | Rapa .................... B60T 17/083 188/170 |
| 5,330,034 A | | 7/1994 | Rancourt et al. |
| 6,360,649 B1 | * | 3/2002 | Plantan ................ B60T 17/083 92/99 |
| 7,392,887 B2 | | 7/2008 | Heyden et al. |
| 8,365,876 B2 | | 2/2013 | Mazur et al. |
| 9,765,835 B2 | | 9/2017 | Plantan et al. |
| 2002/0139242 A1 | * | 10/2002 | Bowyer ................ B60T 17/083 92/78 |
| 2011/0209953 A1 | * | 9/2011 | Fantazi .................. F16D 65/28 188/106 F |

FOREIGN PATENT DOCUMENTS

| | | |
|---|---|---|
| KR | 20-0378631 Y1 | 3/2005 |
| WO | WO 2005/037618 A2 | 4/2005 |

* cited by examiner

BRAKE ACTUATOR USING FLUID BLADDER OR BLADDERS AS FLUID CHAMBERS

BACKGROUND OF THE INVENTION

1. Field of the Invention

Brake actuator air chambers currently consist of a diaphragm and a mating housing to contain air or other fluid to apply or release brakes. This can result in reduced functionality via leak paths that would be eliminated with a bladder or bladders according to the invention.

2. Description of Related Art

U.S. Pat. No. 2,754,805 to Beman discloses an air brake safety device by which air brakes are operated to produce brake application when air pressure in the braking system drops below a predetermined value.

Commonly assigned U.S. Pat. No. 9,765,835 B2 to Plantan et al. concerns a brake actuator having a variable volume chamber for service brake actuation, a spring provided for parking or emergency brake actuation, and a fluid operated parking or emergency brake de-actuation chamber. The entire disclosure of U.S. Pat. No. 9,765,835 B2 to Plantan et al. is incorporated herein by reference as non-essential subject matter.

Other documents of interest are U.S. Pat. No. 3,431,031 to Ike, U.S. Pat. Nos. 3,479,927 and 3,509,795, both to Woodward, U.S. Pat. No. 5,330,034 to Rancourt et al., U.S. Pat. No. 7,392,887 B2 to Heyden et al., U.S. Pat. No. 8,365,876 B2 to Mazur et al., Korean Publication 20-0378631, dated Mar. 16, 2005, Chinese Publication CN 2175713Y, dated Aug. 31, 1994, International Publication WO 2005/037618 A2, dated Apr. 28, 2005, Chinese Publication CN 205113311 U, dated Mar. 30, 2016, and Bendix Service Data Document SD-02-4525, dated October 2017.

SUMMARY OF THE INVENTION

To address the issues present in current brake actuator air chambers noted, a brake actuator is configured to include a plurality of actuator housing portions, a parking piston axially displaceable within one of the actuator housing portions, and a service piston axially displaceable independently of the parking piston within another of the actuator housing portions. A first service brake bladder within the other actuator housing portion mentioned encloses a service volume to be expanded and contracted by fluid supply and relief. At the same time, a second parking brake bladder within the one actuator housing portion encloses a parking de-actuation volume to be expanded and contracted by fluid supply and relief as well. An elastic element disposed between the parking piston and the actuator housing portion opposes expansion of the parking de-actuation volume.

A push rod, operable to produce brake actuation upon depressurization of the second brake bladder, extends through a central hole defined by the second brake bladder. The parking piston is secured to and movable together with the push rod upon pressurization and depressurization of the second brake bladder, and acts as a seat for the elastic element. A brake actuator rod projects from the other of the actuator housing portions and moves outward of the other actuator housing portion upon at least one of fluid supply to the service volume and fluid relief from the parking de-actuation volume, and inward into the other actuator housing portion upon at least one of fluid relief from the service volume and fluid supply to the parking de-actuation volume. At least three actuator housing portions are used, with a central housing portion being disposed between the actuator housing portions within which the parking and service pistons are axially displaceable.

In one preferred arrangement, the central housing portion includes a projection adapted to receive a valve stem associated with at least one of the first and second brake bladders. The valve stem may be secured within the projection by threads, with the threads including external threads on the valve stem and, in one configuration, internal threads on a mating nut cooperating with the external threads on the valve stem. The central housing portion further has a partition with a central opening permitting reciprocation of the push rod within the central housing portion, as well as the actuator housing portions within which the parking and service pistons are axially displaceable.

By way of the present invention, an air bladder or air bladders can function as a brake actuator fluid chamber or brake actuator fluid chambers. A protective housing is still needed. At least a park side bladder has a "donut" shape, allowing an actuator push rod to move through when the parking brake is applied. As it deflates, the inner diameter of the bladder reduces, allowing for the actuator push rod to move smoothly. Functionally an arrangement according to the present invention would be the same as that of an arrangement according to the Plantan et al. patent. On the park side, when no air is applied, the parking brake is applied. As air is applied to the park side, the parking brake is removed. On the service side, when no air is applied, the service brakes are released. As air is applied on the service side, the service brakes engage. The present design is applicable as well to a service chamber, and could be used to replace current air chambers, which consist of a diaphragm and a mating housing to contain the air to apply or release the brakes. These current air chambers can result in several reduced-performance modes via leak paths that would be eliminated with a bladder; these reduced-performance modes relate, for example, to center seal leaks, sealing issues associated with the use of a clamp band and crimping, and misalignment in assembly. The present design may obviate the need for a center seal as is required in present products. Ease of assembly, clocking, and production cost saving issues are also addressed, with ease of assembly being facilitated in particular, since parts of the arrangement only need to protect the bladder from puncture. The assembly does not need to be held together by clamp bands or crimping, and, instead, may be able to utilize bolts or some other connecting device. Since the bladder to actuator interface is not necessarily sealed, it would be acceptable for customers to rotate the port angles as they see fit. Proof pressure testing could be reduced, since sealing comes from the bladder and not the method of assembly, providing potential cost savings.

DETAILED DESCRIPTION OF THE INVENTION

Figure 1:
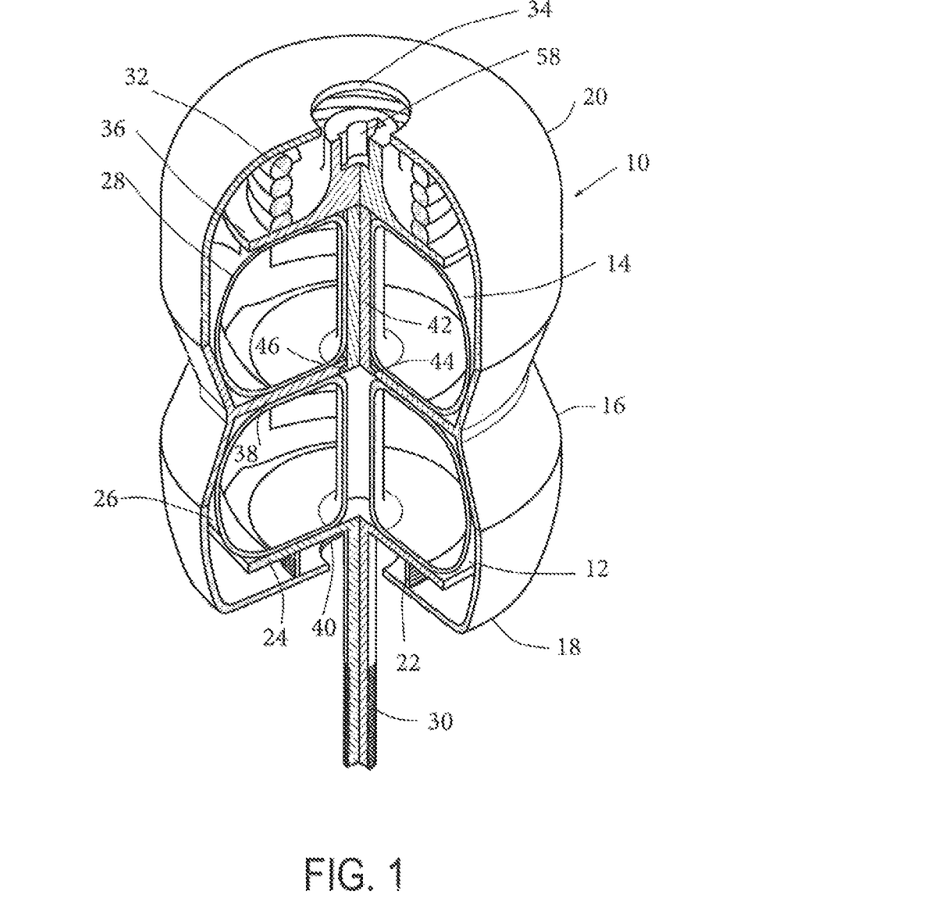
FIG. 1 is a perspective view, partly in section, of a brake actuator according to the present invention.

The present invention has a number of features in common with U.S. Pat. No. 9,765,835 B2 to Plantan et al. mentioned above, but, as noted above, can eliminate the need for the center seal used in the Plantan et al. '835 B2 arrangement. As shown in FIG. 1, the brake actuator 10 of the present invention has a service brake actuator chamber 12 and a parking or emergency brake chamber 14, similar to the Plantan et al. arrangement. The actuator 10 includes a first, preferably cast metal or metal alloy housing portion 16, and a second housing portion 18 defining the service brake actuator chamber 12 within which a service brake bladder 26 is expansible and contractible. The actuator further has a third housing portion 20, disposed on a side of the first housing portion 16 opposite the second housing portion 18, defining the parking or emergency brake de-actuator chamber 14, within which a park side bladder 28 is expansible and contractible. Supply of fluid to the interior of the service brake bladder 26 pressurizes that bladder in opposition to the force applied by a service brake return spring 22, which acts upon a force or pressure distributing element for the bladder 26 formed by a service piston 24. As the second housing portion 18 is located closest to a vehicle brake to which the actuator 10 is to be connected, it may be referred to as a "front" housing portion, while the third housing portion 20 is located farthest from the vehicle brake, and, accordingly may be referred to as a "rear" housing portion. The first housing portion 16 thus constitutes an "intermediate" housing portion, and, in FIG. 1, "front" is the direction toward the bottom of FIG. 1, while "rear" is the direction toward the top of FIG. 1. Expansion and contraction of the bladder 26 within the service brake actuator chamber 12, accordingly, results in frontward and rearward movement of the service piston 24 and a brake actuator rod 30 associated with that service piston 24. The brake actuator rod 30 extends through an opening 40 in the second housing portion 18 for service brake operation and release. The service piston can be a single piece or multiple pieces that cooperate. The piston plate may be modified to fit the shape of the bladder. The invention can be implemented in a service brake only application (no parking chamber).

Operating elements of the brake actuator 10 include a parking or emergency brake actuator spring 32 that has a first end abutting a first actuator spring seat, formed either by a section of the third housing portion 20 located around a central housing portion service opening 34 or, if necessary, by a suitable, separate reinforcing ring located on the section of the third housing portion 20 mentioned. A second end of the parking or emergency brake actuator spring 32, opposite the first end mentioned, rests on a second actuator spring seat defined by the rear-facing side of a parking piston 36. The park side bladder 28 mentioned engages both a front-facing side of the parking piston 36 and a rear-facing side of a radially extending wall or partition 38 forming part of the first housing porting 16. The wall or partition 38 forms a physical barrier between the service brake actuator chamber 12 and the parking or emergency brake de-actuator chamber 14, with opposite sides of the wall or partition 38 defining respective seats for the service brake bladder 26 and the park side bladder 28. The parking piston can be a single piece or multiple pieces that cooperate.

The brake actuator rod 30 and the service piston 24 can be screwed together, welded, integrally formed, or otherwise rigidly joined or connected with one another. Similarly, an actuator push rod 42 can be screwed together, welded, integrally formed, or otherwise rigidly joined or connected with the parking piston 36. By way of this arrangement, the brake actuator rod 30 and the service piston 24 move together axially as a single unit with respect to the overall actuator 10, while the push rod 42 and the parking piston 36 also move together axially as a single unit, independently of the brake actuator rod 30 and the service piston 24, with respect to the overall actuator 10. More particularly, the actuator push rod 42 passes through a central opening 44 in the wall or partition 38 so that the push rod 42 and the parking piston 36 are axially displaceable together as a first single unit, while the brake actuator rod 30 and the service piston 24 are displaceable together, independently of the first single unit, as a second single unit. A suitable friction bearing may be included in the central opening 44 to facilitate passage of the actuator push rod 42 through the opening 44. At an end of the push rod 42 disposed away from its joint or connection with the parking piston 36, a radial enlargement or flange 46 is provided to abut against the wall or partition 38 and limit rearward displacement of the first single unit formed by the parking piston 36 and the push rod 42. At the center of the parking piston 36, an axial recess 58 is provided in a projection aligned with the service opening 34 to permit reception of the T-shaped end of a parking spring caging bolt or other such release tool (not shown) when the parking or emergency brake actuator spring 26 is to be mechanically compressed and rendered inoperative.

Figure 2:
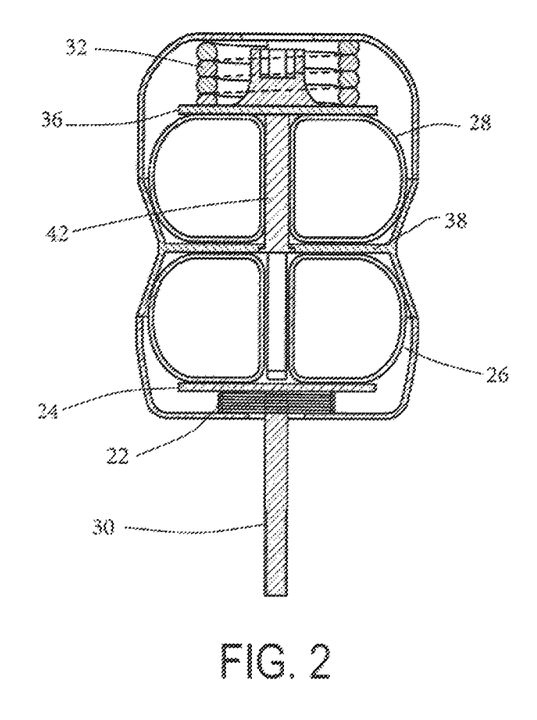
FIG. 2 is a sectional view of the actuator represented in FIG. 1, showing service brake application during normal vehicle operation.
Figure 3:
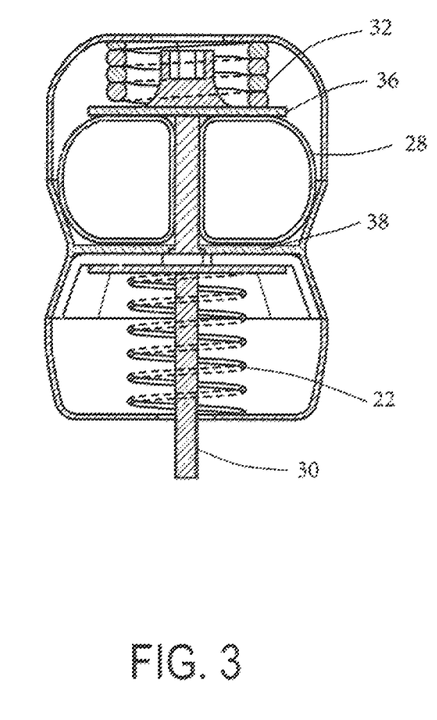
FIG. 3 is a view similar to that of FIG. 2 but showing a service brake release condition during normal vehicle operation.

Action of the actuator 10 during vehicle operation will now be described with reference to FIGS. 2-4. A standard driving situation is represented in FIGS. 2 and 3, with FIG. 2 illustrating service brake application during normal vehicle operation and FIG. 3 illustrating service brake release during normal vehicle operation. In the standard driving situation, fluid pressure is maintained at all times within the park side bladder 28 so that the bladder 28 remains inflated, forcing the parking piston 36 away from the wall or partition 38 and compressing the parking or emergency brake actuator spring 32. At the same time, upon brake application, admission of air into the service brake bladder 26 expands the bladder 26 and forces the service piston 24 away from the wall or partition 38 as represented in FIG. 2, causing the brake actuator rod 30 to move axially and engage the service brake or brakes (not shown). Upon service brake release, air is exhausted from the service brake bladder 26, while fluid pressure continues to be maintained in the park side bladder 28, so that the actuator components are moved by the service brake return spring 22 into the positions represented in FIG. 3.

When brake fluid supply system performance degrades or a failure occurs, or when the vehicle is no longer running, the park side bladder in the parking chamber 14 is depressurized. A pressure loss in the park side bladder 28 permits the parking or emergency brake actuator spring 32 to expand, displacing the parking piston 36 toward the second housing portion 18, i.e. toward the front of the actuator 10. The parking piston 36 is seated on the now-deflated park side bladder 28, which, in turn, is seated on the wall or partition 38 as illustrated in FIG. 4. As the parking or emergency brake actuator spring 32 is stronger than the service brake return spring 22, for example by having a force constant which is greater than that of the return spring 22, the actuator push rod 42 is displaced through the aperture in the wall or partition 38 downwardly in the illustrations supplied, and, in turn, engages the service piston 24 to push the second single unit, including the brake actuator rod 30 and the service piston 24, in a brake application direction and into the position shown in FIG. 4. Pressurizing the park side bladder 28 again, upon fluid supply system repair or when the vehicle is again running, displaces the push rod 42 in an opposite direction, compresses the spring 32, and discontinues parking or emergency brake application. As mentioned, during normal vehicle operation, the parking or emergency brake actuator spring 32 remains compressed, and service brake application and release is performed by respective pressurization of and relief of fluid pressure from the service brake bladder 26.

Figure 5:
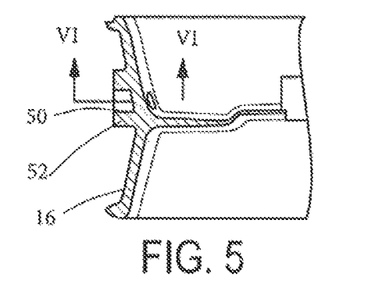
FIG. 5 is a sectional view illustrating the possible location of an opening for a valve provided in a housing portion of the actuator.
Figure 6:
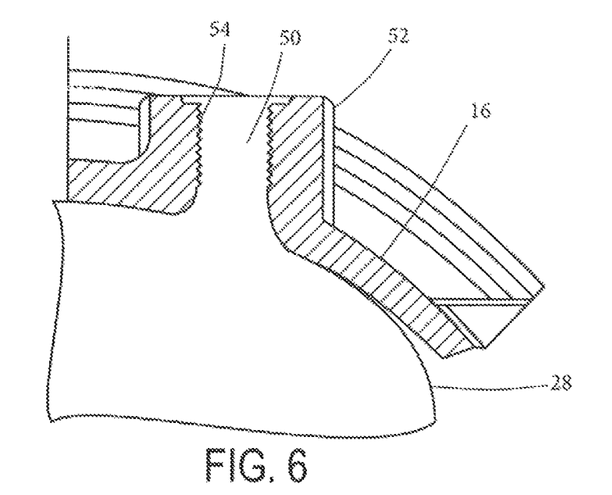
FIG. 6 is a view in direction of section VI-VI of FIG. 5 showing the opening represented in FIG. 5 as including internal threads to mate with external threads on a valve stem.
Figure 7:
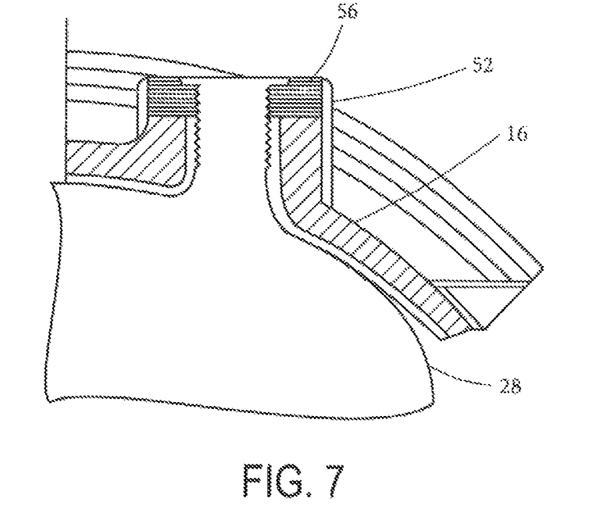
FIG. 7 is a view similar to FIG. 6 but showing another arrangement, in which a separate nut is provided to mate with the external threads on the valve stem.

The part sectional view supplied by FIG. 5 shows one possible location of an opening 50 provided in the preferably cast metal or metal alloy housing portion 16 of the actuator 10. The opening 50 extends through an upstanding projection 52 on the housing portion 16. As illustrated in FIG. 6, the opening 50 can include internal threads 54 to mate with external threads on a valve stem (schematically shown) permitting fluid supply to and fluid discharge from the interior of one of the bladders 26 and 28. Although only one opening 50 is represented in FIG. 5, it is to be understood that each of the bladders 26 and 28 would include a valve stem to permit fluid supply to and fluid discharge from its interior, and the housing portion 16 thus could include two (or more) openings 50. FIG. 7 shows another arrangement, in which a separate nut 56 is provided to secure the externally threaded valve stem (schematically shown) to an exterior surface of the projection 52, which in this case could be unthreaded.

A brake actuator 10 according to the invention will thus be understood to include a plurality of actuator housing portions 16, 18, and 20, a parking piston 36 axially displaceable within one (20) of the actuator housing portions, and a service piston 24 axially displaceable independently of the parking piston 36 within another (18) of the actuator housing portions. Although other shapes of potential bladders are envisioned, FIGS. 1-4 show a first substantially torus-shaped service brake bladder 26 within the other actuator housing portion 18 that encloses a first (service) volume, formed by the interior of the bladder 26, to be expanded and contracted by fluid supply and relief. At the same time, a second substantially torus-shaped parking brake bladder within the one actuator housing portion 20 encloses a second parking volume, formed by the interior of bladder 28, to be expanded and contracted by fluid supply and relief. The elastic element 32 disposed between the parking piston 36 and the actuator housing portion 20 opposes expansion of the second volume formed by the interior of the bladder 28.

A push rod 42, operable to produce brake actuation upon depressurization of the second brake bladder 28, extends through a central hole defined by the second brake bladder 28, and the parking piston 36 is secured to and movable together with the push rod 42 upon pressurization and depressurization of the second brake bladder 28, which acts as a seat for the elastic element 32. A brake actuator rod 30 projects from the other of the actuator housing portions 18. The brake actuator rod 30 moves outward of the other actuator housing portion 18 upon at least one of fluid supply to the first (service) volume (interior of 26) and fluid relief from the second (parking) volume (interior of 28), and inward into the other actuator housing portion 18 upon at least one of fluid relief from the first (service) volume (interior of 26) and fluid supply to the second (parking) volume (interior of 28). At least three actuator housing portions 16, 18, and 20 are used, with a central housing portion 16 being disposed between the actuator housing portions within which the parking and service pistons are axially displaceable. Sealed chambers without vents are also possible with this design.

The central housing portion preferably includes at least one projection 52 adapted to receive a valve stem associated with at least one of the first and second brake bladders 26 and 28. The valve stem may be secured within the projection 52 by threads, with the threads including external threads on the valve stem and, in one configuration, internal threads on a mating nut cooperating with the external threads on the valve stem. The central housing portion further has a partition 38 with a central opening 44 permitting reciprocation of the push rod 42 within the central housing portion 16, as well as the actuator housing portions 18 and 20 within which the parking and service pistons 24 and 36 are axially displaceable.

Figure 8:
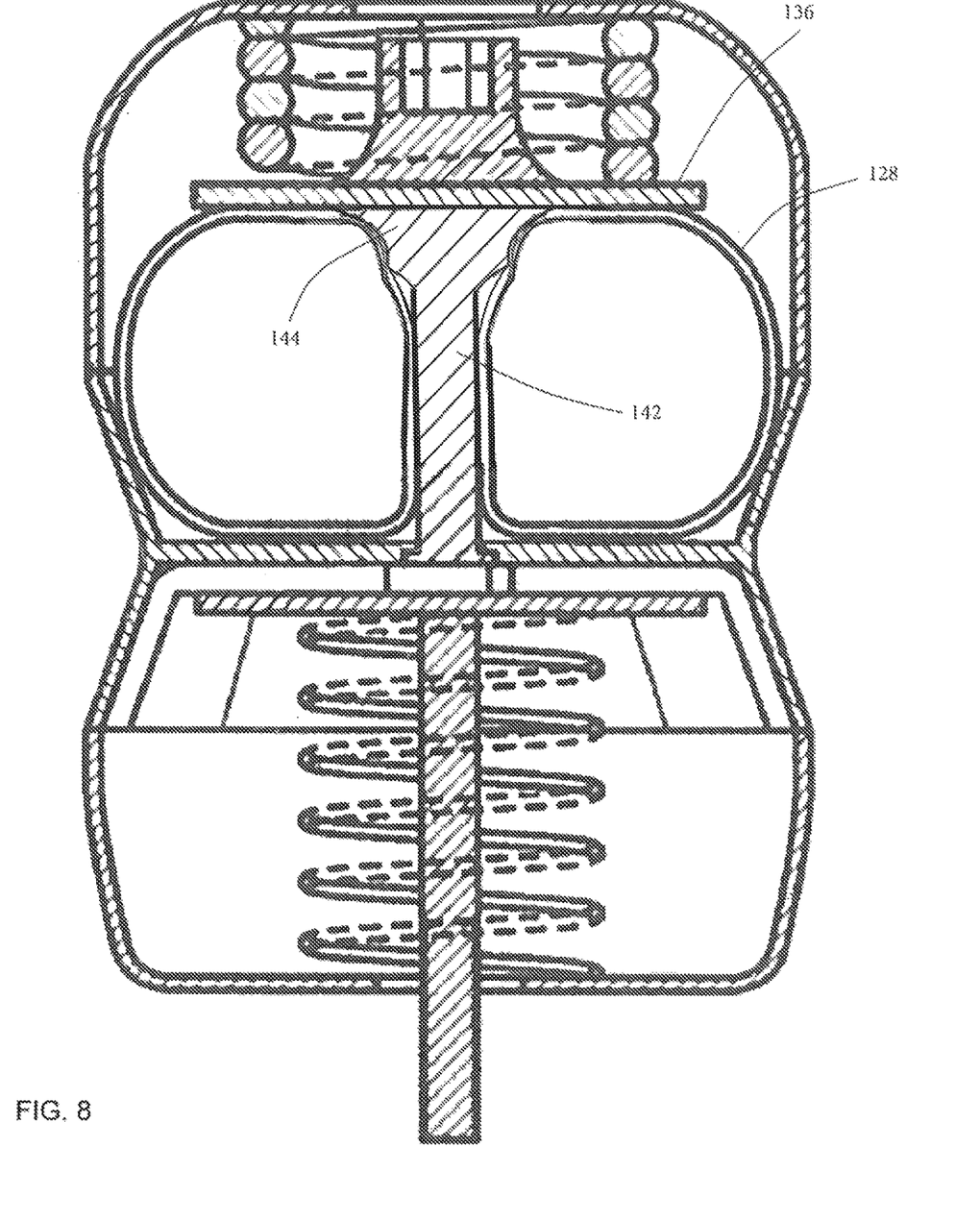
FIG. 8 is a view similar to that of FIG. 3 but showing an alternative actuator push rod structure.

FIG. 8 is a view similar to that of FIG. 3 but showing an alternative actuator push rod 142 having an enlarged end 144 interconnecting the push rod 142 with a parking piston 136. The enlarged end 144 strengthens the joint between the actuator push rod 142 and the parking piston 136, and alters the cross sectional shape of the park side bladder 128 so that is not precisely toroidal.

Figure 9:
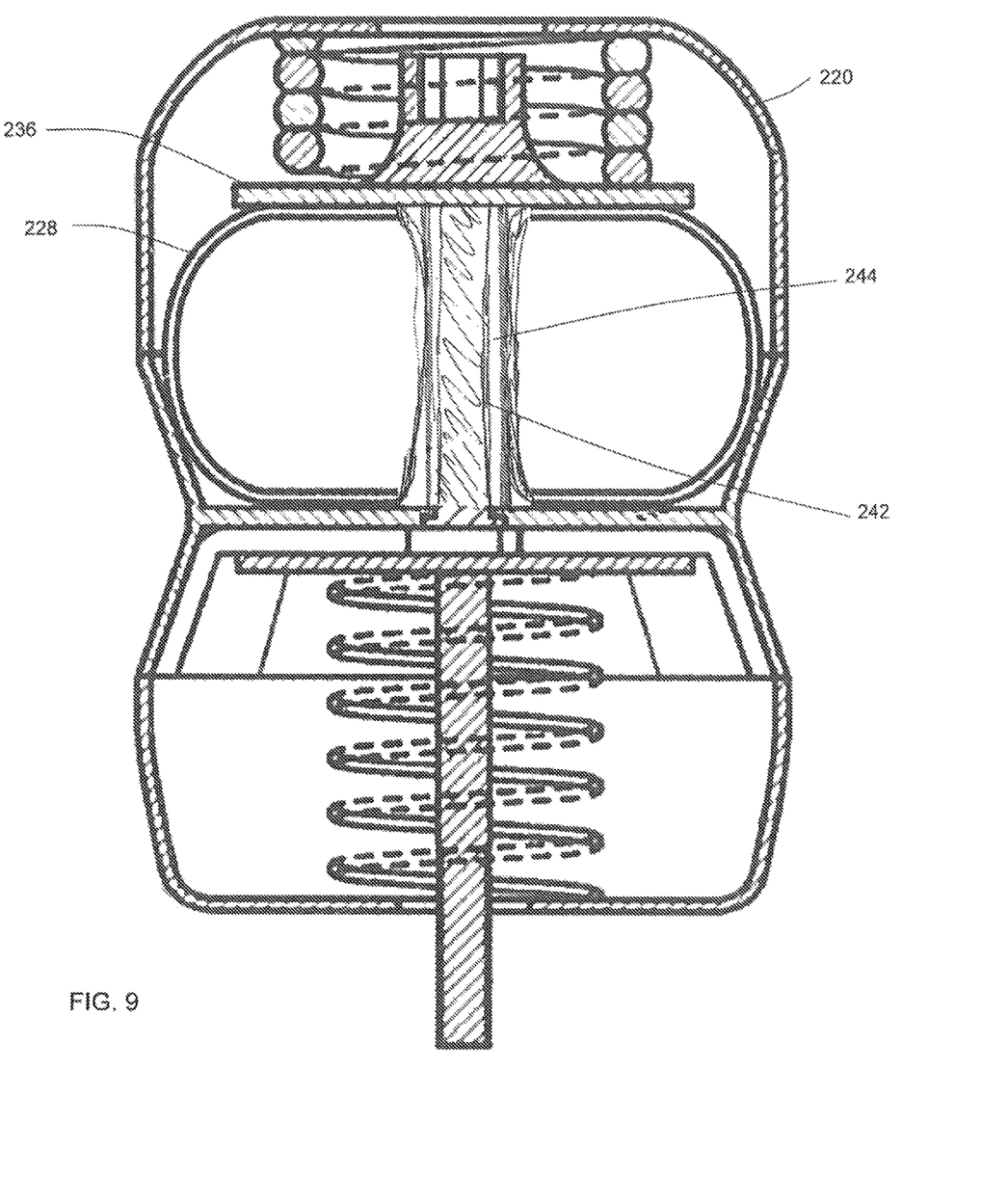
FIG. 9 is a view similar to that of FIG. 3 but showing a protective annular wall surrounding the actuator push rod allowing the push rod to travel while a park side bladder remains inflated.

FIG. 9 is a view similar to that of FIG. 3 but showing an actuator push rod 242 as surrounded by a protective annular wall 244 that allows the push rod 242 to travel while the park side bladder 228 remains inflated. The wall 244 may be collapsible upon discharge of fluid from the bladder 228, as in the arrangement shown, or rigid, in which case the wall 244 could extend through an axial opening (not shown) provided in the parking piston 236 to form a part of the third housing portion 220.

Figure 4:
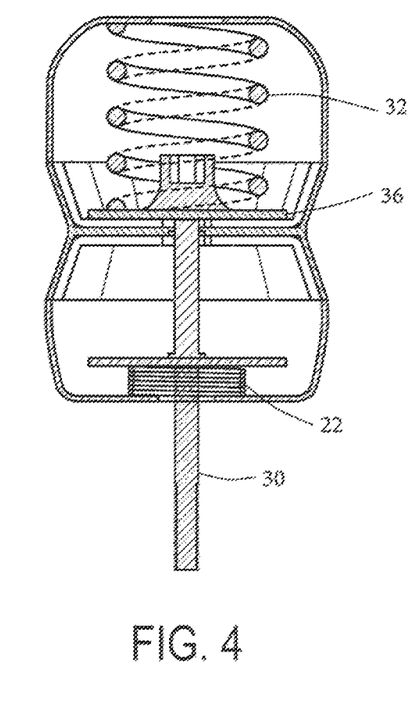
FIG. 4 is a view similar to that of FIG. 2 but showing the actuator when a brake fluid supply system failure occurs, or when the vehicle is no longer running.
Figure 10:
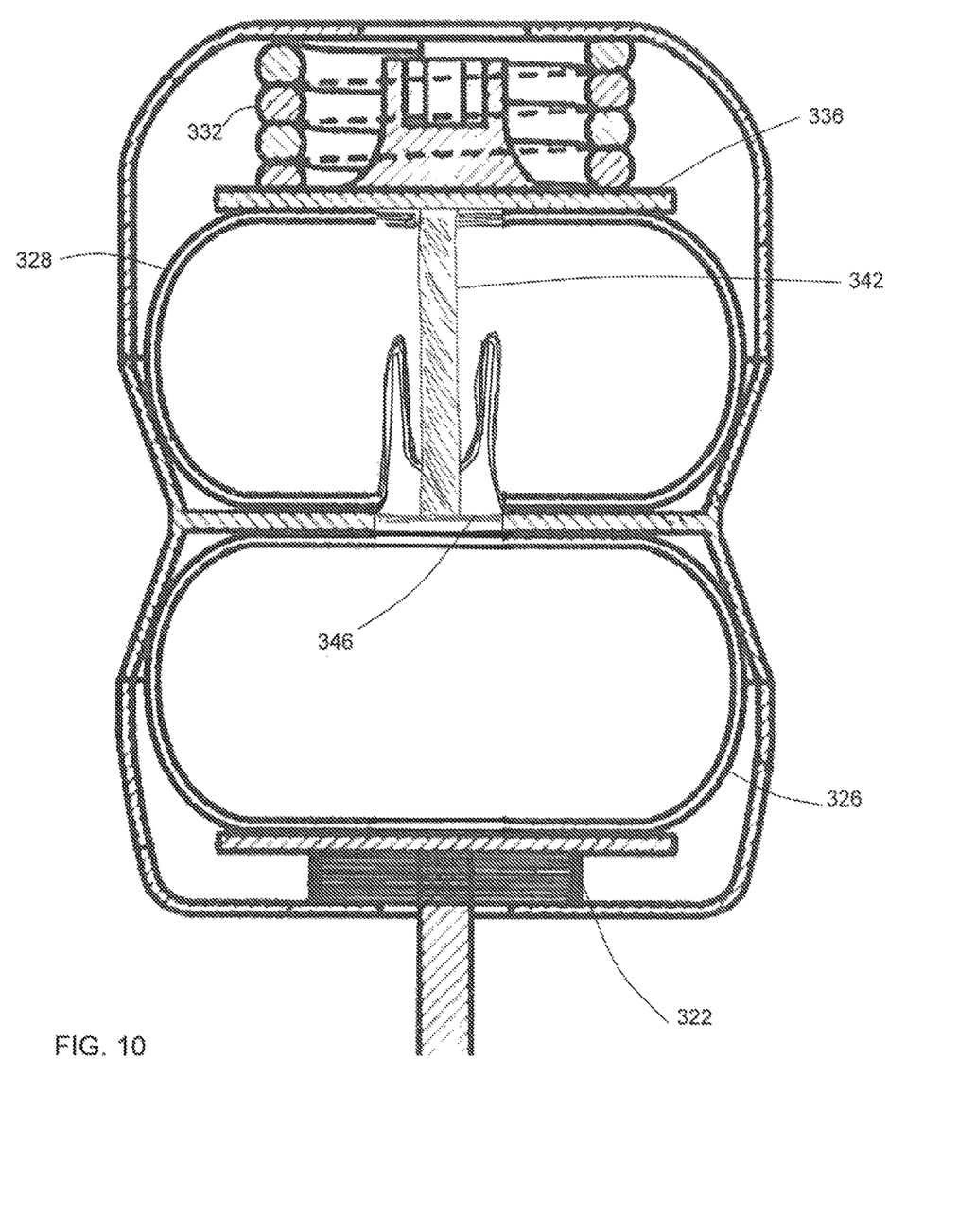
FIGS. 10 and 11 are views similar to those of FIGS. 2 and 4, respectively, but showing an arrangement in which a service brake bladder, when inflated and unconstrained, is non-toroidal and in which a park side bladder is sealed to and constrained for movement with the actuator push rod.
Figure 11:
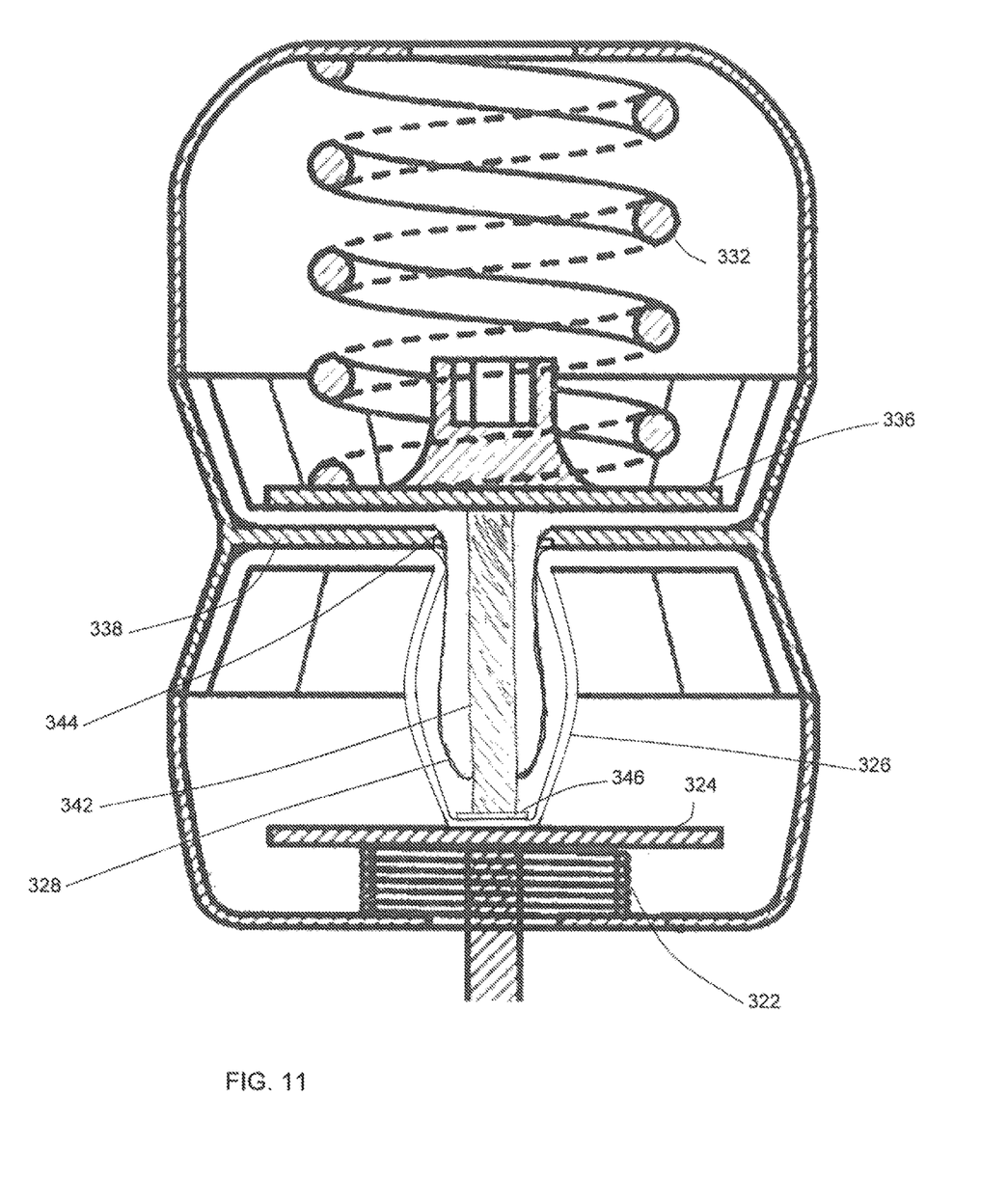

FIGS. 10-11 are views similar to those of FIGS. 2 and 4, respectively, but showing an arrangement in which a service brake bladder 326, when inflated and unconstrained, is spherical, ovoid, oblong, bulbous, or similarly configured instead of toroidal, and in which a park side bladder 328 is sealed and connected to the actuator push rod 342 for movement together with the actuator push rod. By having the push rod 342 formed with or connected to the park side bladder 328 in this way, the bladder 328 is easily rolled up and unrolled. As in the first embodiment described, it is to be understood that when a brake fluid supply system failure occurs, or when the vehicle is no longer running, the park side bladder 328 is depressurized. A pressure loss in the park side bladder 328 permits the parking or emergency brake actuator spring 332 to expand as shown in FIG. 11, displacing the parking piston 336 so that it becomes seated on the now-deflated park side bladder 328, which, in turn, is seated on the wall or partition 338 as illustrated in FIG. 11. As the parking or emergency brake actuator spring 332 is stronger than the service brake return spring 322, for example by having a force constant which is greater than that of the return spring 322, the actuator push rod 342 is displaced through the aperture 344 in the wall or partition 338 downwardly in the illustrations supplied. While the push rod 342 is displaced in this way, the push rod entrains the park side bladder 328 and draws the park side bladder 328 partly through the central opening 344, as shown in FIG. 11, until a radial enlargement or flange 346 of the pushrod 342 presses the service brake bladder 326 against the service piston 324. Pressurizing the park side bladder 328 again, upon fluid supply system repair or when the vehicle is again running, displaces the push rod 342 in an opposite direction, compresses the spring 332, and discontinues parking or emergency brake application. Once again, during normal vehicle operation, the parking or emergency brake actuator spring 332 remains compressed, and service brake application and release is performed by respective pressurization of and relief of fluid pressure from the service brake bladder 326.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A brake actuator comprising:
   a plurality of actuator housing portions,
   a parking piston axially displaceable within one of the actuator housing portions,
   a service piston axially displaceable independently of the parking piston within another of the actuator housing portions,
   a first service brake bladder that, within the other of the actuator housing portions, encloses a first volume to be expanded and contracted by fluid supply and relief,
   a second parking brake bladder that, within the one of the actuator housing portions, encloses a second volume to be expanded and contracted by fluid supply and relief,
   an elastic element disposed between the parking piston and the one of the actuator housing portions to oppose expansion of the second volume,
   a push rod operable to produce brake actuation upon depressurization of the second brake bladder, the push rod extending through a central hole defined by the second brake bladder, the parking piston secured to and movable together with the push rod upon pressurization and depressurization of the second brake bladder, and
   a brake actuator rod projecting from the other of the actuator housing portions, the brake actuator rod moving outward of the other of the actuator housing portions upon at least one of fluid supply to the first volume and fluid relief from the second volume and inward into the other of the actuator housing portions upon at least one of fluid relief from the first volume and fluid supply to the second volume.

2. The brake actuator of claim 1, wherein the plurality of actuator housing portions includes at least three housing portions, with a central housing portion disposed between the actuator housing portions within which the parking and service pistons are axially displaceable.

3. The brake actuator of claim 2, wherein the central housing portion includes at least one projection adapted to receive a valve stem associated with at least one of the first and second brake bladders.

4. The brake actuator of claim 3, wherein the valve stem is secured within the at least one projection by threads.

5. The brake actuator of claim 4, wherein the threads include external threads on the valve stem.

6. The brake actuator of claim 5, wherein the threads include threads on the at least one projection.

7. The brake actuator of claim 4, wherein the threads include internal threads on a mating nut cooperating with the external threads on the valve stem.

8. The brake actuator of claim 2, wherein the central housing portion has a partition with a central opening permitting reciprocation of the push rod within the central housing portion and the actuator housing portions within which the parking and service pistons are axially displaceable.

9. A brake actuator comprising:
   a plurality of actuator housing portions,
   a parking piston axially displaceable within one of the actuator housing portions,
   a service piston axially displaceable independently of the parking piston within another of the actuator housing portions,
   a substantially torus-shaped parking brake bladder that, within the one of the actuator housing portions, encloses a volume to be expanded and contracted by fluid supply and relief,
   an elastic element disposed between the parking piston and the one of the actuator housing portions to oppose expansion of the volume,
   a push rod operable to produce brake actuation upon depressurization of the brake bladder, the push rod extending through a central hole defined by the second brake bladder, the parking piston secured to and movable together with the push rod upon pressurization and depressurization of the second brake bladder and acting as a seat for the elastic element, and
   a brake actuator rod projecting from the other of the actuator housing portions, the brake actuator rod moving outward of the other of the actuator housing portions by way of force applied by the elastic element upon fluid relief from the second volume and inward into the other of the actuator housing portions upon opposition to the force applied by the elastic element by fluid supply to the second volume.

10. The brake actuator of claim 9, wherein the plurality of actuator housing portions includes at least three housing portions, with a central housing portion disposed between the actuator housing portions within which the parking and service pistons are axially displaceable.

11. The brake actuator of claim 10, wherein the central housing portion includes at least one projection adapted to receive a valve stem associated with the brake bladder.

12. The brake actuator of claim 11, wherein the valve stem is secured within the at least one projection by threads.

13. The brake actuator of claim 12, wherein the threads include external threads on the valve stem.

14. The brake actuator of claim 13, wherein the threads include threads on the at least one projection.

15. The brake actuator of claim 13, wherein the threads include internal threads on a mating nut cooperating with the external threads on the valve stem.

16. The brake actuator of claim 10, wherein the central housing portion has a partition with a central opening permitting reciprocation of the push rod within the central housing portion and the actuator housing portions within which the parking and service pistons are axially displaceable.

17. A method of operating a brake actuator including a plurality of actuator housing portions, a parking piston axially displaceable within one of the actuator housing portions, a service piston axially displaceable independently of the parking piston within another of the actuator housing portions, comprising:
   moving a brake actuator rod projecting from the other of the actuator housing portions outward of the other of the actuator housing portions upon at least one of fluid supply to a first substantially torus-shaped service brake bladder and fluid relief from a second substantially torus-shaped parking brake bladder, and
   moving the brake actuator rod inward into the other of the actuator housing portions upon at least one of fluid relief from the first substantially torus-shaped service brake bladder and fluid supply to the second substantially torus-shaped parking brake bladder.

18. The method of claim 17, wherein the plurality of actuator housing portions includes at least three housing portions, with a central housing portion disposed between the actuator housing portions within which the parking and service pistons are axially displaceable.

19. The method of claim 18, further comprising receiving a valve stem associated with at least one of the first and second brake bladders in at least one projection from the central housing portion.

20. The method of claim 19, further comprising securing the valve stem within the at least one projection by threads.

21. A brake actuator comprising:
   a plurality of actuator housing portions,
   a parking piston axially displaceable within one of the actuator housing portions,
   a service piston axially displaceable independently of the parking piston within another of the actuator housing portions,
   a first service brake bladder that, within the other of the actuator housing portions, encloses a first volume to be expanded and contracted by fluid supply and relief,
   a second parking brake bladder that, within the one of the actuator housing portions, encloses a second volume to be expanded and contracted by fluid supply and relief,
   an elastic element disposed between the parking piston and the one of the actuator housing portions to oppose expansion of the second volume,
   a push rod formed with at least one of the service and parking brake bladders and operable to produce brake actuation upon depressurization of the second brake bladder, the push rod extending through a central hole defined by the second brake bladder, the parking piston secured to and movable together with the push rod upon pressurization and depressurization of the second brake bladder, and
   a brake actuator rod projecting from the other of the actuator housing portions, the brake actuator rod moving outward of the other of the actuator housing portions upon at least one of fluid supply to the first volume and fluid relief from the second volume and inward into the other of the actuator housing portions upon at least one of fluid relief from the first volume and fluid supply to the second volume.

\* \* \* \* \*